F. BEGUSCH.
INSTRUMENT FOR MINUTE MEASURINGS.
APPLICATION FILED JUNE 24, 1914.

1,143,165.

Patented June 15, 1915.

Witnesses:
Geo. E. Tew
Mary Rogers.

Franz Begusch
By John A. Bommhardt
Attorney.

UNITED STATES PATENT OFFICE.

FRANZ BEGUSCH, OF LIESLING, NEAR POTTSCHACH, AUSTRIA-HUNGARY.

INSTRUMENT FOR MINUTE MEASURINGS.

1,143,165.  Specification of Letters Patent. Patented June 15, 1915.

Application filed June 24, 1914. Serial No. 846,956.

*To all whom it may concern:*

Be it known that I, FRANZ BEGUSCH, engineer, of Liesling, near Pottschach, Lower Austria, Austria-Hungary, have invented certain new and useful Improvements in and Relating to Instruments for Minute Measurings, and I do hereby declare the following to be a full, clear, and exact description of the invention, such as will enable others skilled in the art to which it appertains to make and use the same.

The present invention relates to micrometers of the kind in which the measure can be read off on the circumference of a tube by means of a screw pitch with the assistance of a graduated scale. In those micrometers which have been known up to the present and serve the same purpose, the reading off with the small scale graduations which are arranged on the circumference of the concentric tube, in connection wherewith the pitch of the micrometer screw threads appears as determined, involves loss of time, is inconvenient, and in the case of measurements below the thousandth of an inch or the one hundredth of a millimeter unreliable so that thereby erroneous and inaccurate readings occur. This defect is substantially obviated by the present micrometer by the one thousandth of an inch or the thousandth of a millimeter scale graduations appearing on the circumference of the tube and the sliding index or runner, the pitch being independent of the micrometer screw threads, so that any desired length of graduation with relatively small tube diameter can be insured. Consequently it is possible for the thousandths and ten thousandths of an inch graduations to be at considerable distances apart and the eye thus enabled to read off quickly and reliably.

Figure 1:
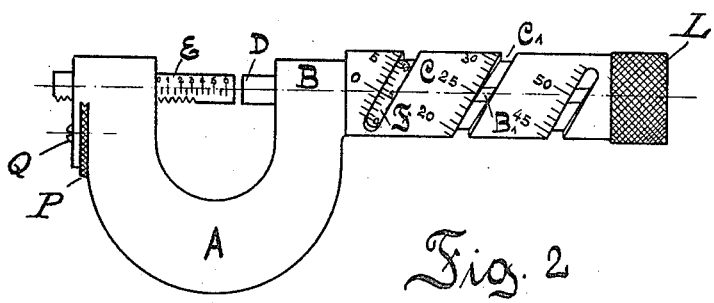
Figure 2:
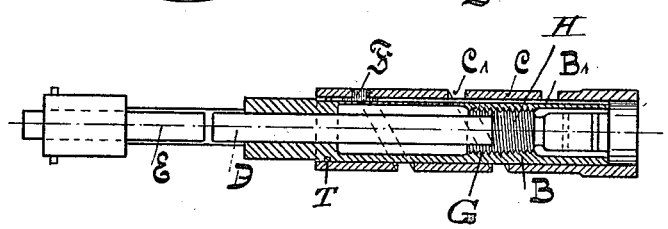
Figure 3:
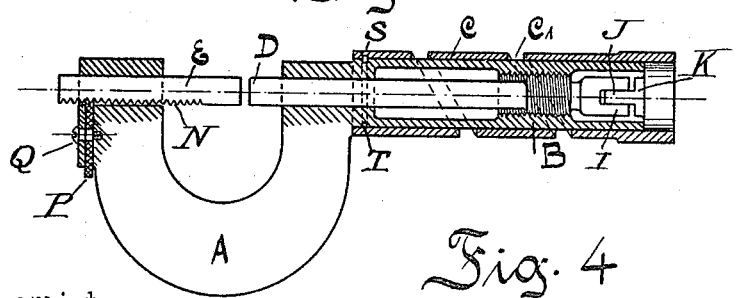
Figure 4:

Figure 1 of the drawing is an elevation view of a micrometer. Fig. 2 is a horizontal longitudinal section. Fig. 3 is a vertical longitudinal section, and Fig. 4 a development of the spiral shaped scale with 1/1000 and 1/10000 inch graduations and a scale for 1/20th of an inch on the counter spindle.

The instrument illustrated embodying the invention is composed of a yoke A, an internally threaded tubular casing B, a tube or sleeve C surrounding the casing B and rotatable thereon, a measuring spindle D, a counter spindle E, and an index F. The sleeve C is held on the casing B by a screw S running in a groove T around the casing.

The yoke A is firmly connected or integral with the screw casing B, which is furnished with a 1/40 inch or 0.5 mm. pitch screw thread G into which the screw part H of the spindle D fits, which spindle is provided with jaws I at the end into which fits a tongue J of an interior extension K of the end of the tube C so as to revolve the spindle D by turning the milled end L of the tube C and producing lengthwise travel of the spindle D. The tubular casing B is provided with a longitudinal guide groove B' along its length, see Fig. 2, and in this fits a stud of the index F which index is marked with indications of 1/10000 of an inch graduations and such index F is fitted in a spiral groove C' cut in the tube C, the edges of such spiral groove C' in the tube C being marked with scale markings of 1/1000 of an inch graduations.

The counter spindle E is fitted in one end of the yoke A in a hole co-axial with the hole of the tubular casing B carrying the spindle D, and is provided with teeth N which are engaged by the V-shaped edge of a plate P secured to the yoke A by a screw Q after the spindle E has been adjusted as to position, but any other means of connecting the counter spindle E to the yoke and for adjusting same therewith can be adopted.

The index F is provided with vernier scale markings coöperating with the scale marked on the tube C along the slot C' and will be read in conjunction with the line markings on C in a well known manner.

If an object is placed between the measuring spindle D and the counter spindle E for the purpose of measurement the tube C is turned by its milled head L by means of the fingers until the ends of D and E touch the article. Through the rotation of the tube C the measuring spindle D is simultaneously moved endwise by action on the screw portion H by the screw thread G whereby the index F is moved axially to right or left in the groove B' with the assistance of the groove C' and the reading off is effected with the assistance of the index F on the spiral scale on the tube C.

Now in normal condition the counter spindle E is fixed to the yoke with its index marking O registering with the edge of the yoke, the whole of the other portion of the index being exhibited so that the end of the counter spindle E is at its proper position for measuring by the spindle D and reading from the indexes on C and F, but where an article to be measured is known to be of a larger size than the measurements indicated on the scale on C and within the capabilities of the instrument, then the counter spindle is adjusted and fixed in the yoke for a certain measurement which is added to the measurement on C and F to find the correct measurement of the article being measured.

I claim:—

1. A micrometer having a measuring spindle D, a rotary sleeve C having a spiral groove provided with a scale, a sliding index F projecting into and movable in said groove, and means for producing longitudinal movement of the index parallel to the spindle D, when the sleeve is turned.

2. A micrometer having a measuring screw spindle, a fixed casing surrounding same and provided with a longitudinal guide, an index movable lengthwise in said guide, and a rotary sleeve on the casing, connected to the spindle to screw the same in or out, and having a spiral groove with scale divisions, in which the index travels when the sleeve is turned.

3. A micrometer comprising a yoke, an internally threaded tubular casing fixed thereto and having an external longitudinal guide groove, a measuring spindle screwed into said casing, a sleeve rotatable on said casing and connected to the spindle to turn the latter, said sleeve having a spiral groove and provided with scale marks beside said groove, and an index member slidable in said guide groove and projecting into and movable in said spiral groove and provided with a vernier scale coöperating with said scale.

In testimony whereof I affix my signature, in presence of two witnesses.

FRANZ BEGUSCH.

Witnesses:
 JOHANN LEER,
 AUGUST FUGGER.

Copies of this patent may be obtained for five cents each, by addressing the "Commissioner of Patents, Washington, D. C."